(12) United States Patent
Saillard

(10) Patent No.: US 10,502,636 B2
(45) Date of Patent: Dec. 10, 2019

(54) TEMPERATURE-MEASURING STICK WITH AN EASILY REPLACEABLE THERMOCOUPLE

(71) Applicant: AREVA NC, Courbevoie (FR)

(72) Inventor: Jean Saillard, Couville (FR)

(73) Assignee: ORANO CYCLE, Châtillon (FR)

( * ) Notice: Subject to any disclaimer, the term of this patent is extended or adjusted under 35 U.S.C. 154(b) by 313 days.

(21) Appl. No.: 15/540,866

(22) PCT Filed: Dec. 28, 2015

(86) PCT No.: PCT/EP2015/081275
§ 371 (c)(1),
(2) Date: Jun. 29, 2017

(87) PCT Pub. No.: WO2016/107838
PCT Pub. Date: Jul. 7, 2016

(65) Prior Publication Data
US 2018/0003566 A1  Jan. 4, 2018

(30) Foreign Application Priority Data

Dec. 31, 2014 (FR) ..................... 14 63479

(51) Int. Cl.
*G01K 1/00*  (2006.01)
*G01K 7/00*  (2006.01)
(Continued)

(52) U.S. Cl.
CPC ............... *G01K 1/146* (2013.01); *G01K 1/08* (2013.01); *G01K 1/12* (2013.01); *G01K 1/14* (2013.01);
(Continued)

(58) Field of Classification Search
USPC ........................... 374/139, 179, 208
See application file for complete search history.

(56) References Cited

U.S. PATENT DOCUMENTS 3,493,439 A    2/1970  Boyle
4,410,756 A *  10/1983 Schwagerman ......... G01K 1/14
                                                                136/201
(Continued)

FOREIGN PATENT DOCUMENTS

CN    2016 22171 U   11/2010
FR    1 510 548 A     1/1968
FR    2 894 024 A1    6/2007

OTHER PUBLICATIONS

Search Report issued in French Patent Application No. 1463479 dated Sep. 17, 2015.
(Continued)

*Primary Examiner* — Mirellys Jagan
(74) *Attorney, Agent, or Firm* — Pearne & Gordon LLP

(57) ABSTRACT

The invention relates to a thermocouple (17) suspended from a part (26, 27) that can be locked onto a connecting section of the measuring stick, which comprises an opening in the form of a guiding cone (30) for inserting the thermocouple. The thermocouple is contained in a flexible cable (24) that can slide in a sheath (35) of the central compartment (16) which houses the thermocouple (17). A spring (34) can be added to lightly press the end of the thermocouple to the end of the housing thereof.

11 Claims, 2 Drawing Sheets

(51) Int. Cl.
- *G01K 1/14* (2006.01)
- *G01K 1/08* (2006.01)
- *G01K 7/02* (2006.01)
- *G01K 1/12* (2006.01)
- *G01K 7/06* (2006.01)
- *G01K 7/08* (2006.01)
- *F04D 29/046* (2006.01)
- *G01K 1/16* (2006.01)

(52) U.S. Cl.
CPC .............. *G01K 7/02* (2013.01); *G01K 7/06* (2013.01); *G01K 7/08* (2013.01); *F04D 29/046* (2013.01); *G01K 1/16* (2013.01); *G01K 7/025* (2013.01)

(56) References Cited

U.S. PATENT DOCUMENTS

| | | |
|---|---|---|
| 5,181,779 A | 1/1993 | Shia |
| 2006/0185450 A1 | 8/2006 | Kimura |
| 2008/0298430 A1 | 12/2008 | Brun |
| 2011/0222583 A1 | 9/2011 | Boghun et al. |

OTHER PUBLICATIONS

International Preliminary Report on Patentability issued in Patent Application No. PCT/EP2015/081275 dated Jul. 21, 2016.
International Search Report issued in Patent Application No. PCT/EP2015/081275 dated Mar. 21, 2016.
Written Opinion issued in Patent Application No. PCT/EP2015/081275 dated Mar. 21, 2016.

* cited by examiner

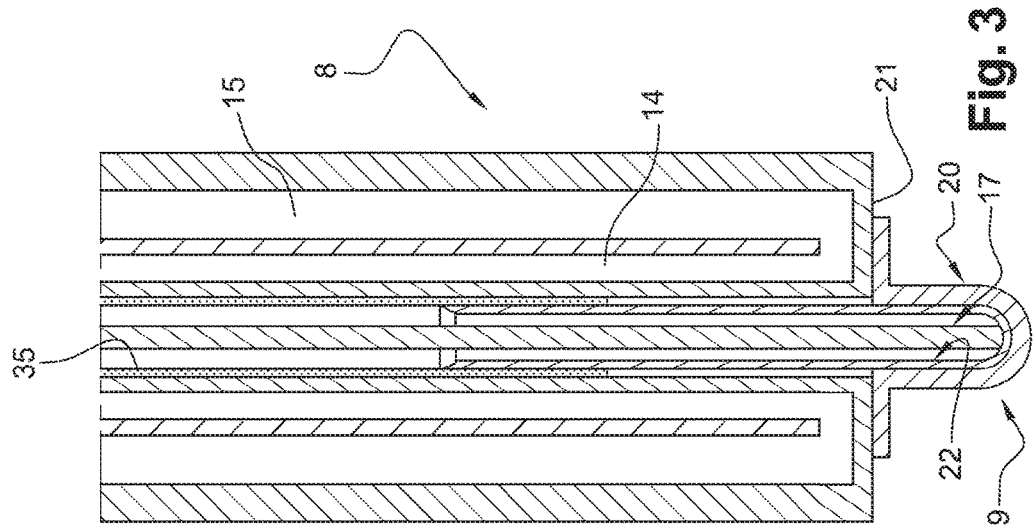
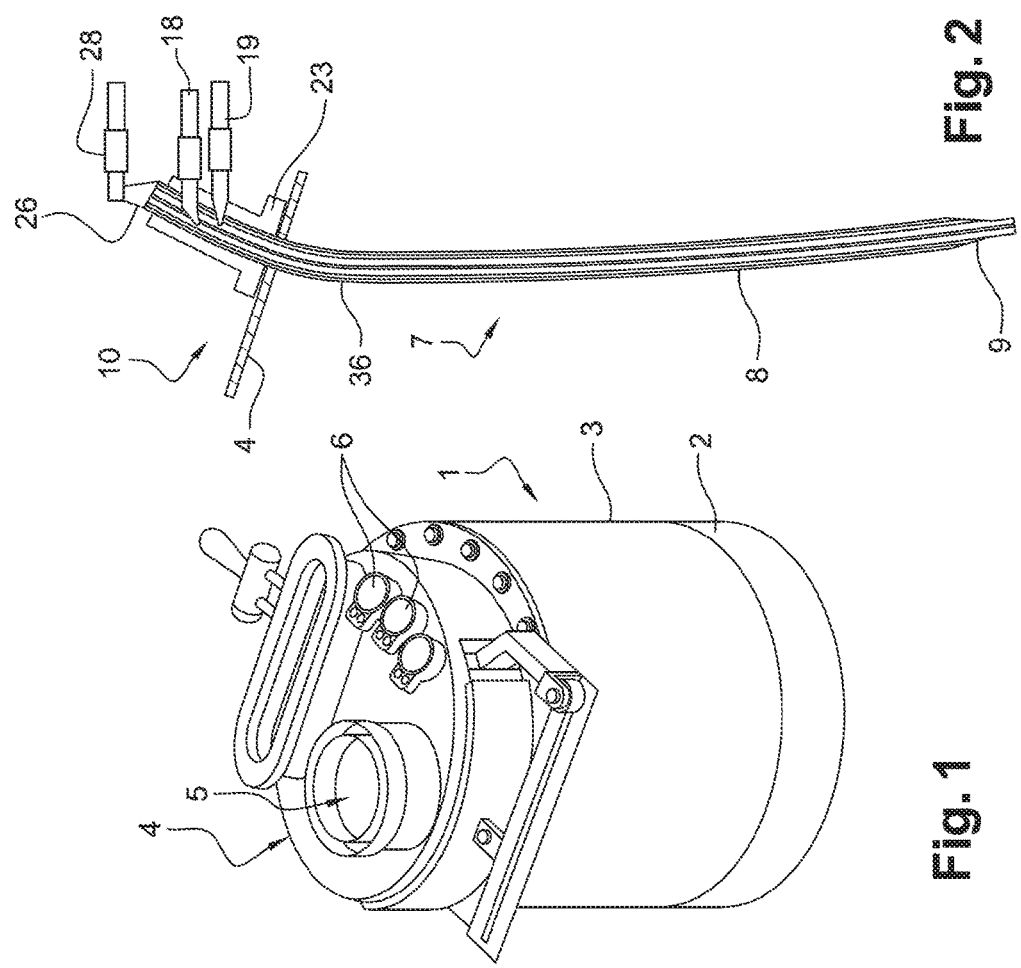

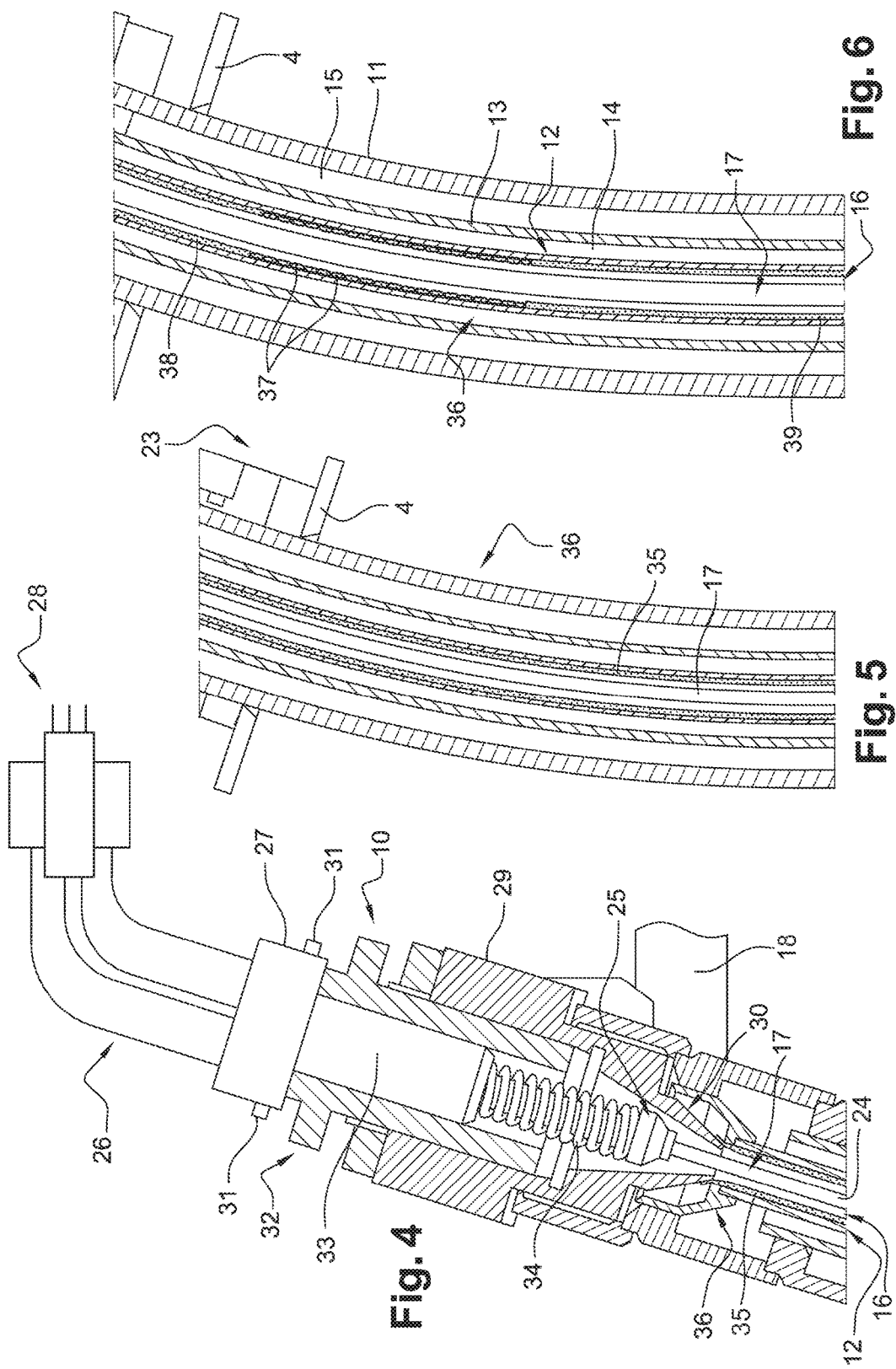

TEMPERATURE-MEASURING STICK WITH AN EASILY REPLACEABLE THERMOCOUPLE

The present invention relates to a temperature-measuring stick, the thermocouple of which is easily replaceable.

This stick concerns the same technical field as French patent 2 894 024, that it can improve on the other hand, although it may also be applicable to measuring sticks with different designs.

Temperature-measuring sticks in question here are generally used to measure temperatures of high temperature molten baths in crucibles heated by electric induction, for example to vitrify radioactive waste. They comprise a shell in which the thermocouple extends from a measuring tip, and the opposite end of the shell and of the thermocouple exits from the crucible to terminate in the external medium. The goal herein is to replace the thermocouple without having to disassemble the measuring stick, by resorting if need be to operations by telemanipulation arms, which is often necessary when the environment is radioactive and is enclosed in a protective cell. The thermocouples are indeed a fragile equipment which has to be replaced sometimes. However, they are also delicate to properly manipulate, because of their great length and their low rigidity and their small housing in the stick; yet telemanipulators have the drawback to have a low handleability.

Known prior art comprises documents U.S. Pat. No. 5,181,779 A, FR 1 510 548 A and US 2006/185450 A1. The first one describes a temperature-measuring stick the external shell of which, of ceramics covered with a protective coating that can be of glass fibres, ceramic fibres or a mixture of refractory powder and glass powder, contains a sheath also of ceramics, the function of which is to protect the internal element, comprising the thermocouple, from reducing gases produced by shell oxidation. The tube containing the thermocouple is rigid because it is of ceramics, in particular of nearly pure alumina, and the sheath is not considered as a tube sliding sheath; finally, there is no conical opening at the inlet of the sliding sheath, able to facilitate introducing the tube into the sheath.

The second document describes a temperature-measuring stick the end of which is disassemblable and joined to the rest of the stick by a locking hub. This end contains one end of the thermocouple. The document thus does not disclose a locking hub between the structure of the stick and the thermocouple carrying sheath, so as to facilitate replacing the same.

The third document describes a temperature-measuring stick inserted in a double wall. A conical opening is present, but it is not used to facilitate introducing the stick into a sheath, but to limit stick sinking by a screwing stop of the same on the opening.

The object of the invention is a temperature-measuring stick, remarkable in that it allows ready thermocouple replacements even by a telemanipulator tool the movement possibilities and accuracy of which are reduced. The solution to this technical problem is ensured by the combination of the following means: the thermocouple is housed in a flexible cable, and the conventional stick shell contains a concentric sheath, in which the cable can slide without excessively folding when it is moved down; the shell is joined to a conical interface, tapering outwardly, which enables the cable to be conveniently introduced into the shell; and a locking device is provided between a piece integral with the cable and interface.

None of known prior documents, even taken in combination, enables this technical problem to be solved.

To sum up and under a general form, the invention relates to a temperature-measuring stick, comprising a shell, a longitudinal compartment, contained in the shell between an interface with an external medium and a measuring tip belonging to the shell, and a thermocouple housed in the compartment, characterised in that the thermocouple comprises a flexible cable forming an external shell of the thermocouple, the compartment is delimited by a cable sliding sheath, the interface comprises a conical opening for introducing the cable, leading to the compartment and tapering to said compartment, and the thermocouple comprises a piece lockable to the interface.

The thermocouple is in the form of a module comprising a cable protecting the wires and the thermocouple junction, and enabling it to slide without risk of entanglement in the longitudinal compartment delimited by the shell. Since this compartment is now provided with a sheath facilitating sliding the cable, the cable can be moved down without risk of damage or deformation to the tip, after which the piece at the opposite end of the thermocouple can be locked to the stick, for example by a slight rotational movement.

In order to ensure that the thermocouple is properly contacting the material of the tip and can thus make measurements in an unbiased manner, the thermocouple advantageously comprises a spring extending between a bearing surface bearing against the cable and a bearing surface bearing against the locking piece. When the thermocouple is fully moved down into the compartment, the length of the cable is sufficient for the tip of the thermocouple to reach the bottom of the tip, and for the cable to exert thereby a compression of the spring; this compression maintains thermocouple contact.

The sheath can be of a flexible material and be then crimped to a thermally insulating sleeve, belonging to the tip, or to the conical opening which facilitates introducing the thermocouple. In other embodiments, the sheath can be of a thermally insulating rigid material. If the stick is bent and that the sheath also, the latter can be divided into segments at the place of the bend.

The invention will be now described in detail under its different aspects, characteristics and advantages, by means of the following figures:

FIG. 1 is a schematic representation of a crucible equipped with the measuring stick;

FIG. 2 schematically illustrates the stick;

FIG. 3 represents the region of the stick tip;

FIG. 4 represents the connecting region between the stick and the thermocouple;

FIG. 5 represents a bent region of the stick;

and FIG. 6 represents the same region according to another embodiment.

FIG. 1 schematically represents an induction melting crucible 1. It essentially comprises a lower hearth 2, a cylindrical ferrule 3, and a dome 4 acting as a lid. The inductors surrounding the ferrule 3 and performing heating of its load are not represented here, nor are other construction features already known and which are not modified according to the invention, as the division of the ferrule 3 into sectors, in order to stop induced currents, or the inner cooling channels. The dome 4 comprises in particular an aperture 5 for introducing the load to be vitrified or additives and bores 6, allowing passage to specially measuring equipment, and in particular to at least one temperature-measuring stick 7, described in the following figures. A stick 7 comprises (FIG. 2) a barrel 8 connected at one tip 9 to a free end and at a connecting part 10 to an opposite end, this connecting part 10 acting as an interface with an external medium to the crucible 1, a circuit for refilling the coolant and measurement tracking apparatuses of the thermocouple. As visible in FIG. 6, the barrel 8 comprises an external shell 11, an internal shell 12 concentric to the previous one, a medium shell 13 located between both previous ones, this medium shell 13 separating an inlet duct 14 for the coolant and an outlet duct 15 for this coolant, a counter-current flow passing successively through these ducts. The internal shell 12 delimits a central compartment 16 receiving a thermocouple 17. The ducts 14 and 15 communicate with each other, at the bottom of the barrel 8 close to the tip 9 (FIG. 3), but remain separated elsewhere. They are in communication with a feed 18 and a discharge 19 of cooling water, which belongs to the connecting part 10, outside the dome 4. The central compartment 16 is a longitudinal compartment, extending in the stick 7 from the connecting part 10 to the tip 9.

The tip 9 comprises (FIG. 3) an external shell 20, connecting to a bottom plate 21 of the barrel 8, and a tubular liner 22 of alumina or more generally of ceramics, which extends inside the external shell 20 and offers thermal protection to the thermocouple 17, the end of which extends in the liner 22 and touches it at its end.

The connecting part 10 comprises a flange 23 by which the stick 7 is attached to the dome 4 (FIG. 2).

The thermocouple 17 will now be briefly described using FIGS. 4 and 5.

The wires of the thermocouple 17 are sheathed by a flexible and smooth cable 24, slidable in the central compartment 16, and which are thus not represented. The cable 24 comprises a collar 25 which extends in the connecting part 10, then passes through a cylindrical locking piece 26, provided with a rotary external ring 27 and to which a socket 28 for the wires of the thermocouple 17 is secured, as a Jupiter (trademark) socket. The connecting part 10 comprises a piece 29 for introducing the thermocouple, provided with a conical opening 30 tapering to the barrel 8 and aligned with the inlet of the inner shell 12. The locking ring 27 is grooved and can be snapped on spurs 31 of a sleeve 32 attached to the introducing piece 29, by sliding the spurs 31 in bent grooves it has. A cylindrical centring finger 33 is then fitted in the bore of the sleeve 32. The collar 25 and the cylindrical finger 33 include opposite bearing faces, between which a spring 34 is compressed, the spring 34 surrounding a portion of the cable 24. This arrangement enables the cable 24 to be pushed back downwardly of the stick 7, and to ensure that the end of the thermocouple 17 touches the liner 22 and efficiently measures the temperature reached at this place.

The inner shell 12 is coated with a sheath 35 (FIG. 3), which forms the wall of the central housing 16. The sheath 35 and the liner 22 are crimped into each other, and the other end of the sheath 35 is crimped between the tip of the cone 30 and a bore at the bottom of a bowl 36 joining the internal shell 13 to the external shell 12.

With this arrangement, the replacement of the thermocouple 17 can be made in the following way, in a situation where the surroundings of the crucible 1 would be inaccessible for safety reasons, and a telemanipulation should be employed. The thermocouple 17 is first suspended to a rope hooked to a travelling hoist, the cable 24 hanging down. A telemanipulator grips the cable 24 and enters it into the stick 7, installed through the dome 4, by guiding it through the opening of the introducing piece 29 and by gradually moving down the hoist. The tip of the cable 24 is guided by the cone 30 in the central housing 16, and then to the bottom of the liner of alumina 22. The cable 24 stiffens the thermocouple 17 and enables it to slide along the sheath 35 without being folded, such that the awkwardnesses of the telemanipulator do not cause a detrimental effect, and that the tip of the thermocouple 17 properly arrives in the place assigned thereto. The end of the process consists in locking the ring 27 of the locking piece 26 by slightly compressing the spring 34, and then connecting the socket 28 of the thermocouple 17 to benefit from its measurements. The thermocouple 17 is unhooked from the rope. The removal of the thermocouple 17 is performed by a reverse operation.

The sheath 35 should both promote sliding of the cable 24 during its introduction, and make up an electrical shield, while resisting the inflow of surrounding heat. The proper slidability has to be all the more preserved that the stick 7 can make a bend 36 under the dome 4 (FIG. 5), and that the cable 24 thus has friction in this place. The sheath 35 being in the form of a flexible continuous membrane, comprised for example of a braid of glass fibres impregnated with a solvent-free polyurethane varnish, can be replaced by an alumina sheath, which also has the abovementioned properties. The manufacture of an alumina curve would be however difficult and its assembly impossible, and that's why one can (FIG. 6), in the location of the bend 36, use tubular beads 37, superimposed with each other, between two tubes 38 and 39, also of alumina, which make the rest of the sheath extending to the ends of the internal shell 13, as for the previous embodiment.

The stick 7 equipped with the invention can be implanted several times on the same crucible 1.

The invention claimed is:

1. A temperature-measuring stick, comprising a shell, a longitudinal compartment contained in the shell, between an interface with an external medium and a measuring tip belonging to the shell, and a thermocouple housed in the compartment, wherein the thermocouple comprises a flexible cable forming an external shell of the thermocouple, the compartment is delimited by a cable sliding sheath, the interface comprises a conical opening for introducing the cable, leading to the compartment and tapering to said compartment, and the thermocouple comprises a locking piece, lockable to the interface.

2. The temperature-measuring stick according to claim 1, wherein the thermocouple comprises a spring extending between a bearing surface for bearing against the cable and a bearing surface for bearing against the locking piece, and compressed between the bearing surfaces at a locking state of the piece to the interface.

3. The temperature-measuring stick according to claim 1, wherein the sheath is crimped to a thermally insulating liner belonging to the tip.

4. The temperature-measuring stick according to claim 1, wherein the sheath is crimped to the conical opening.

5. The temperature-measuring stick according to claim 1, wherein the shell is double and comprises an internal shell and an external shell, and cooling channels extend between the internal shell and the external shell.

6. Temperature-measuring stick according to claim 1, wherein the sheath is flexible and comprised of a braid of glass fibres coated with a solvent-free polyurethane varnish.

7. The temperature-measuring stick according to claim 1, wherein the sheath is of a thermally insulating rigid material.

8. The temperature-measuring stick according to claim 7, wherein the material of the sheath is alumina.

9. The temperature-measuring stick according to claim 1, wherein the locking piece comprises a cylindrical centring finger, carrying a bearing surface for bearing against the locking piece, said finger sliding in a sleeve integral with the shell.

10. The temperature-measuring stick according to claim 9, wherein the shell is bent as well as the sheath, and the sheath is divided into tubular bead type segments, where it is bent.

11. The temperature-measuring stick according to claim 10, wherein the material of the sheath is alumina.

* * * * *